United States Patent [19]

Click

[11] 4,357,775
[45] Nov. 9, 1982

[54] FISH BAIT POSITIONER

[76] Inventor: Loring H. Click, 2319 Kimbrough Woods Pl., Germantown, Tenn. 38138

[21] Appl. No.: 203,864

[22] Filed: Nov. 4, 1980

[51] Int. Cl.³ .............................................. A01K 95/00
[52] U.S. Cl. .................................... 43/43.1; 43/43.15; 43/42.74
[58] Field of Search .................. 43/42.74, 43.1, 43.15, 43/44.98

[56] References Cited

U.S. PATENT DOCUMENTS

| | | | |
|---|---|---|---|
| 2,157,003 | 5/1939 | Mussina | 43/42.74 |
| 2,289,663 | 7/1942 | Linhares | 43/42.74 |
| 2,456,254 | 12/1948 | Caruso | 43/43.15 |
| 2,787,858 | 4/1957 | Best | 43/43.15 |
| 2,803,081 | 8/1957 | Nicholson | 43/43.1 |
| 2,877,594 | 3/1959 | Birrell | 43/42.74 |
| 2,961,793 | 11/1960 | Buchanan | 43/42.74 |
| 3,744,178 | 7/1973 | Denny | 43/42.74 |

Primary Examiner—Stephen G. Kunin
Assistant Examiner—K. Bradford Adolphson
Attorney, Agent, or Firm—Mathew R. P. Perrone, Jr.

[57] ABSTRACT

A fish bait positioner includes an off-center, weighted base having a flexible reed slideably mounted on the weighted base at one end of the flexible reed and a bait holder secured at the other end of the flexible reed.

9 Claims, 1 Drawing Figure

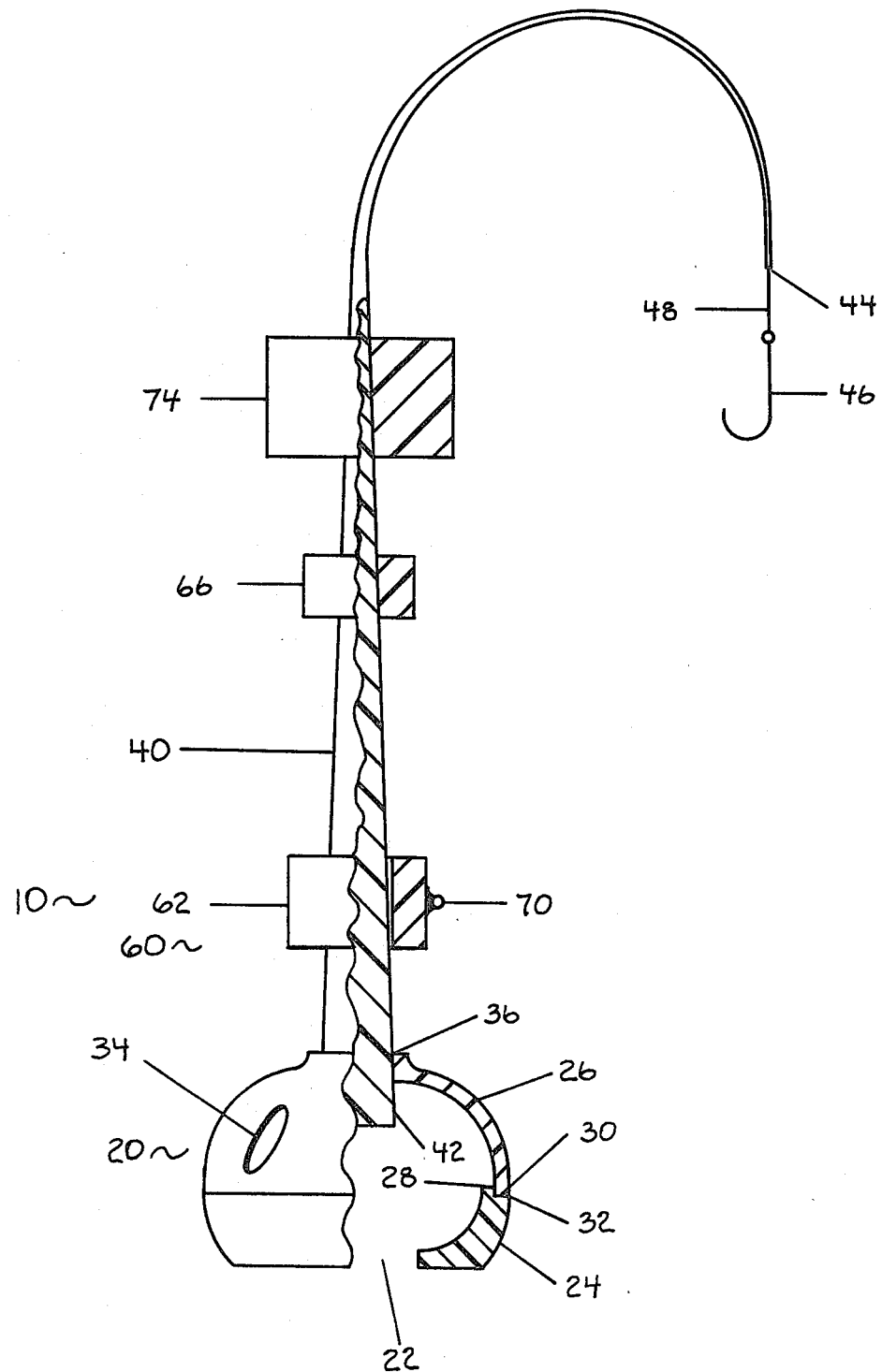

FISH BAIT POSITIONER

BACKGROUND OF THE INVENTION

This invention relates to fishing and more particularly to an article of manufacture for positioning bait.

Even with the development of many different types of devices, fishing is still more of an art than a science. Because of its artistic quality, fishing, from either a commercial or sporting view, is a great challenge. It is, therefore, desirable to provide a device which will assist the fisherman in his efforts.

One of the clear facts developed over the years is that some classes of fish tend to feed along the bottom of their habitat. It thus becomes desirable to position the hook and bait near the bottom of the fishing habitat.

Yet positioning bait near the bottom of the fishing habitat is difficult for many reasons. The condition of the bottom is not usually known or easily determined. Another reason is that the distance to the bottom is not generally known. Furthermore, it is desirable to move bait to attract attention of the fish. Yet live bait tends to hide from the fish by not moving. These and other difficulties clearly indicate the compexities of this problem.

There are many devices for positioning the bait along the bottom of the fishing habitat. These devices, however, suffer from a number of problems above and beyond those mentioned above. Some devices are not easily moveable without upsetting the whole device. Other devices, once positioned, cannot be activated in such a fashion as to move the bait without upsetting the device. Yet it is desirable to move the bait to attract the attention of the fish. Still other bait positioning devices tangle the line and interfere with the fishing. A device achieving accurate and certain position while retaining the desired mobility and avoiding upset of the bait positioner is of value.

SUMMARY OF THE INVENTION

Therefore, it is an object of this invention to provide a device for positioning fish bait near the bottom of the fishing habitat.

A further object of this invention is to provide a device capable of moving the bait while the device is positioned on the bottom of the fishing habitat.

Yet a further object of this invention is to provide a bait positioning device which will minimize line entanglements.

A still further object of this invention is provide a device which overcomes the problem of determining the nature of the bottom of the habitat.

Another object of this invention is to provide a device which overcomes the problem of determining the distance to the bottom.

These and other objects of this invention are met by providing a fishbait positioner having an off-center, weighted base at one end of a flexible reed and a bait holder at the other end of the flexible reed.

BRIEF DESCRIPTION OF THE DRAWING

The sole FIGURE of the drawing depicts the fishbait positioner 10 in partial cross-section.

DESCRIPTION OF THE PREFERRED EMBODIMENTS

A fishbait positioner is weighted to land in a particular position and leave the bait free to move with a gentle tug on the fishline while not disturbing the setting of the positioner.

This result is accomplished by forming fishbait positioner 10 with a base 20 having attached thereto a flexible reed 40 as shown in the sole FIGURE.

Base 20 is a weighted base with its center of gravity off-center, which base 20 has a cavity 22 therein formed by weighted bottom 24 and top 26 being joined to form base 20 at their respective largest and substantially equal diameters. Cavity 22 is formed by weighted bottom 24 of base 20 having the shape of an annular, truncated, hemisphere, while top 26 is also hemispherical and hollow in shape. At the wider base of weighted bottom 24, weighted bottom 24 mates with the base of top 26. Weighted bottom 24 is made of material denser than water and has sufficient weight to make the entire bait positioner 10 sink to the bottom of the fishing habitat and land with weighted bottom 24 touching the bottom of the fishing habitat. Base 20 is here described as spherical, to show a preferred shape of the base. When base 20 is generally spherical, the outside diameter thereof is generally about 2 to 5 centimeters, and the inside diameter about 1.5 to 4.9 centimeters. However, any other shape or diameter may be suitable provided the desired weight relation is maintained and the desired cavity aspect is maintained.

Base 20 may be formed in any suitable fashion. A preferred way is shown in the sole FIGURE of the drawing. Weighted bottom 24 has a mating edge 28 which mates in a male-female relationship with top 26 such that top 26 contacts weighted bottom 24 at a top contact edge 30 of top 26. Contact edge 30 is secured to weighted bottom 24 at edge 32 of weighted bottom 24. By "secured", is meant glued, fused or otherwise secured.

Top 26 can optionally include at least one slot 34. A sufficient number of slots 34 are in top 26 to provide water flow therethrough, and assist in the sinking and retrieving of fishbait positioner 10 by reducing turbulence while at the same time leaving top 26 with sufficient strength to be secured to weighted bottom 24 and to support flexible reed 40.

Flexible reed 40 is preferably secured to base 20 through aperture 36 generally in the apex of top 26. Flexible reed 40 has topend 42 and baitend 44 at opposite ends thereof with hook 46 attached to baitend 44. Other fishing means may also be used. Flexible reed 40 fits through aperture 36 at topend 42 of flexible reed 40 and is flanged, pinned, tapered to match a taper of aperture 36 in a male-female relationship, or otherwise secured to top 26. The tapered form is a preferred means of securing flexible reed 40 to base 20.

Hook 46 may be secured to bait positioner 10 in any suitable fashion. It is desirable to make hook 46 easily changeable so that different hooks or lures may be secured to positioner 10. This is preferably achieved by fusing one end of leader 48 to baitend 44, and attaching hook 46 or a similar item to the other end of leader 48. Leader 48 may be any standard leader used in the fishing art to connect fishing line to a fishing hook or lure. Leader 48 may also be attached to baitend 44 in any other suitable fashion such as by an eyelet, glue or other methods.

Topend 42 of flexible reed 40 has a larger diameter than does baitend 44 at the other end of flexible reed 40. Thus flexible reed 40 is tapered from topend 42 to baitend 44. In a preferred form flexible reed 40 has topend 42 with a diameter of 6 to 12 times the diameter of bait end 44. More preferably, flexible reed 40 has topend 42 with a cross-sectional diameter of 7 to 10 times that of bait end 44. Most preferably, topend 42 has a diameter of 8 to 9 times that of bait end 44. The diameter of topend 42 is generally up to about 0.6 centimeters. More preferably, topend 42 has a diameter of about 0.1 to 0.5 centimeters. Most preferably, the diameter of topend 42 is about 0.2 to 0.4 centimeters. Also the taper of flexible reed 40 is preferably and substantially uniform.

Flexible reed 40 can have any suitable length which may be determined by the fisherman. A preferred length is in the range of 5 to 75 centimeters. Even more preferably, the desired length is 15 to 50 centimeters. Most preferably the desired flexible reed length is 30 to 40 centimeters.

Flexible reed 40 can be made of any suitable fishing material having the desired strength and tapering capability which contact the water without having an adverse effect on the ecology. Nylon and especially translucent or transparent nylon is one example of such material.

Similarly top 26 must be made of an ecologically safe moldable or shapeable material having less weight than the material from which bottom 24 is made. An example of a suitable material is a polymethylmethacrylate or similar plastic. An example of a suitable plastic is a product known as Lucite ® and available from E. I. DuPont.

Bottom 24 must comprise the bulk of the weight of the fishbait positioner 10, so that bottom 24 can always land on the bottom of the fishing habitat to thereby provide a proper position for fish bait positioner 10. Bottom 24 must also be of an ecologically safe material. Lead is one suitable material therefor. Bottom 24 in a preferred embodiment comprises 51 to 95 percent by weight of the fishbait positioner 10. More preferably, bottom 24 comprises 55 to 90 percent by weight of the fishbait positioner 10. Most preferably, bottom 24 comprises 60 to 85 percent by weight of the fishbait positioner.

Situated on flexible reed 40 between topend 42 and baitend 44 is fish line attachment 60. Line attachment 60 includes yoke 62 and yoke aperture 70. Between line attachment 60 and baitend 44, stop 66 is secured to flexible reed 40. Yoke 62 is slideably mounted on flexible reed 40, is tubular in nature, and held on reed 40 because the inside diameter of line attachment 60 is smaller than the diameter of topend 42 and stop 66. Yoke aperture 70 is secured to yoke 62 by glue, fusion or equivalent means. It is through yoke aperture 70 that the fishing line (not shown) may attached to positioner 10 and thereby to a fishing rod (not shown).

The diameter of topend 42 is greater than the diameter of aperture 36 in top 26 of weighted base 20. Thus flexible reed 40 is held on base 20 in a slideable fashion by a combination of topend 42, yoke 62 and stop 66. Between attachment 60 and baitend 44 is optionally secured a float 74 for the purpose of insuring that flexible reed 40 will be substantially perpendicular to the bottom of the fishing habitat at the points between base 20 and float 74. Float 74 and stop 66 may be combined to achieve the desired function of both. Stop 66 may also be a clamp or other securing means as an integral part of yoke 62.

Due to the taper of flexible reed 40, baitend 44 forms an arc and points in the general direction of the bottom of the habitat. A pull on a fish line activates attachment 60 and causes baitend 44 to move. This movement is accentuated by the taper of flexible reed 40 and causes baitend to move up to 360° in a plane parellel to the bottom of the fishing habitat, or up to 180° in a plane perpendicular to the bottom. Such movement tends to attract fish to the bait. The attachment 60 and base 20 combine with the other features to leave bait positioner in substantially the same position while avoiding line entanglements or other problems.

What is claimed and sought to be secured by Letters Patent of the United States is:

1. A fishbait positioner comprising a weighted base and a flexible reed slideably mounted therein, wherein:
   a. said weighted base is hollow and comprises a bottom portion secured to a top portion;
   b. said bottom portion comprises 51 to 95 percent by weight of said fishbait positioner, so that said weighted base touches a bottom of a fishing habitat when said fishbait positioner is in use;
   c. said bottom portion is hollow;
   d. said top portion of said weighted base has therein a mounting aperture for mounting said flexible reed;
   e. said flexible reed has a topend and a baitend;
   f. said topend is slideably mounted in said weighted base at said aperture;
   g. said top portion further includes at least one slot to permit water to pass therethrough, when said fishbait positioner is in use, and permit reduced turbulence in the sinking and retrieving of said fishbait positioner;
   h. a fishline attachment is slideably mounted on said flexible reed between said topend and a stop, said stop being secured to said flexible reed between said fishline attachment and said baitend;
   i. said flexible reed is tapered and has a cross-sectional diameter at said topend 6 to 12 times that of said baitend; and
   j. said topend and said aperture mate in a male-female relationship.

2. The positioner of claim 1 wherein said base is spherical in shape.

3. The positioner of claim 2 wherein:
   a. said bottom portion is formed from a material denser than water and comprises 55 to 90 by weight of said positioner;
   b. said top portion is formed from a material less dense than water;
   c. said top portion is secured to said flexible reed at said topend.

4. The positioner of claim 3 further comprising a float secured to said flexible reed between said stop means and said baitend, said float having a density less than that of water.

5. The fishbait positioner of claim 1 wherein:
   a. said bottom is a truncated hemisphere, is weighted, and comprises 60 to 85 percent by weight of said fishbait positioner;
   b. said at least one slot includes one to four slots to permit water to pass therethrough;
   c. said flexible reed is tapered so that said topend has a cross-sectional diameter 7 to 10 times a cross-sectional diameter of said baitend; and
   d. a float means secured on said flexible reed between said baitend and said stop means in order to hold said flexible reed vertical between said weighted bottom and said float means thereby allowing flexibility between said float means and said baitend so that said baitend is in up to about a 180° arc with reference to said float.

6. The fishbait positioner of claim 1 wherein:
a. said bottom portion comprises 60 to 85 percent by weight of said fishbait positioner;
b. said at least one slot includes one to four slots to permit water to pass therethrough; and
c. said flexible reed is tapered so that said topend has diameter 8 to 9 times that of said baitend.

7. The fishbait positioner of claim 6 wherein said stop is incorporated in a float, said float having a density less than that of water and being sufficient to permit the portion of said flexible reed between said float and said weighted base to be perpendicular to the bottom of the fishing habitat.

8. The fishbait positioner of claim 7 wherein said attachment comprises:
a. a yoke slideably mounted on said flexible reed;
b. a yoke aperture secured to said yoke; and
c. a fishing line secured at one end to said yoke aperture and at the other end to a fishing rod.

9. The fishbait positioner of claim 8 wherein a leader is secured at one end to said baitend and at the other end to a hook.

* * * * *